US010692161B2

(12) United States Patent
Saratsis et al.

(10) Patent No.: US 10,692,161 B2
(45) Date of Patent: Jun. 23, 2020

(54) METHOD AND SYSTEM FOR DETERMINING ENERGY MANAGEMENT STRATEGIES

(71) Applicant: Station A, Inc., San Francisco, CA (US)

(72) Inventors: Emmanouil Saratsis, Oakland, CA (US); Sam Steyer, San Francisco, CA (US); Kevin Berkemeyer, San Francisco, CA (US)

(73) Assignee: STATION A, INC., San Francisco, CA (US)

( * ) Notice: Subject to any disclaimer, the term of this patent is extended or adjusted under 35 U.S.C. 154(b) by 437 days.

(21) Appl. No.: 15/456,373

(22) Filed: Mar. 10, 2017

(65) Prior Publication Data
US 2018/0260920 A1 Sep. 13, 2018

(30) Foreign Application Priority Data
Mar. 8, 2017 (GR) .............................. 20170100096

(51) Int. Cl.
*G06Q 50/16* (2012.01)
*G06Q 10/06* (2012.01)

(52) U.S. Cl.
CPC ......... *G06Q 50/163* (2013.01); *G06Q 10/067* (2013.01); *G06Q 10/06315* (2013.01)

(58) Field of Classification Search
CPC ............................... G06Q 10/00; G06Q 40/00
(Continued)

(56) References Cited

U.S. PATENT DOCUMENTS 7,305,983 B1   12/2007   Meder et al.
7,500,391 B2    3/2009   Woro
(Continued)

FOREIGN PATENT DOCUMENTS

WO   WO-2016081628 A1   5/2016
WO   WO-2018165419 A1   9/2018

OTHER PUBLICATIONS

Petrus "Simulation of energy saving potential of a centralized HVAC system in an academic building using adaptive cooling technique", Nov. 2013, Energy Conversion and Management vol. 75, pp. 617-628.*

(Continued)

*Primary Examiner* — Romain Jeanty
(74) *Attorney, Agent, or Firm* — Wilson, Sonsini Goodrich & Rosati

(57) ABSTRACT

In one aspect, a Customer Acquisition method and system are provided to identify target customers and market sizing based on forecasting a customer's energy usage and determining a customized set of energy product offerings to satisfy a customer's energy needs. In another aspect, an Energy Resource Management method and system are provided to select and place energy products to meet the requirements of a particular objective function for a utility, power provider and/or customer. Objective functions can comprise of peak usage reduction, bill or cost minimization, deferred utility upgrades, emissions reduction, efficiency increases, and energy conservation. In still another aspect, an Energy Resource Management method and system are provided for anticipating and estimating implementation costs, optimizing installation strategy and product placement for the purposes of customer cost savings and budgeting.

11 Claims, 18 Drawing Sheets

(58) Field of Classification Search
USPC .................................................... 705/7.25
See application file for complete search history.

(56) References Cited

U.S. PATENT DOCUMENTS

| | | | |
|---|---|---|---|
| 7,832,267 B2 | 11/2010 | Woro | |
| 8,274,506 B1 | 9/2012 | Rees | |
| 8,285,603 B2* | 10/2012 | Carlin | G06Q 10/06 |
| | | | 705/26.7 |
| 8,417,061 B2 | 4/2013 | Kennedy et al. | |
| 8,429,003 B2* | 4/2013 | Zaloom | G06Q 10/0639 |
| | | | 705/7.39 |
| 8,494,922 B2* | 7/2013 | Carlin, Jr. | G06Q 10/06 |
| | | | 705/26.7 |
| 8,521,337 B1* | 8/2013 | Johnson | H02J 3/008 |
| | | | 700/297 |
| 8,571,922 B2* | 10/2013 | Zaloom | G06Q 10/0639 |
| | | | 705/7.39 |
| 9,087,338 B2 | 7/2015 | Levine et al. | |
| 9,196,009 B2 | 11/2015 | Drees et al. | |
| 9,778,719 B2* | 10/2017 | Gan | G06Q 10/04 |
| 2009/0177458 A1 | 7/2009 | Hochart et al. | |
| 2011/0231320 A1* | 9/2011 | Irving | G06Q 30/00 |
| | | | 705/80 |
| 2014/0018969 A1 | 1/2014 | Forbes, Jr. et al. | |
| 2014/0137257 A1 | 5/2014 | Martinez et al. | |
| 2014/0200861 A1 | 7/2014 | Devito et al. | |
| 2014/0207431 A1 | 7/2014 | Reinhart et al. | |
| 2015/0161747 A1 | 6/2015 | Keene, Jr. et al. | |

OTHER PUBLICATIONS

Dingding et al "Analysis of energy saving optimization of campus buildings based on energy simulation", Dec. 2013, Front. Energy, 7(3): 388-398.*

Reilly, M., Google's new tool says nearly 80 percent of roofs are sunny enough for solar panels. Sustainable Energy. Mar. 15, 2017. 7 pages.

PCT/US2018/021534 International Search Report and Written Opinion dated May 2, 2018.

* cited by examiner product overview product process product process

[304] 10 Databases
- ○ EnergyStar Certifications Database
- ○ LEED Certifications Database
- ○ DoE Building Templates Database
- ○ LinkedIn Database
- ○ Google Places Database
- ○ Location-Specific Building Permits
- ○ HVAC Surveys
- ⦿ Salesforce Database
- ⦿ Blue Pillar Database
- ⦿ Bloomberg Credit Rating Database

[305] 5 Geospatial Features
- ○ OpenStreetMaps Data
- ○ Utility Service Territory Data
- ○ Location-Specific Zoning Data
- ● Location-Specific Parcel Data
- ● Location-Specific Building Data

[306] 3 Network Maps
- ○ Utility Circuit Mapping
- ○ Utility Substation Mapping
- ○ Location-Specific Street Network

[301] ○ open-access data
[302] ⦿ NRG-licensed data
[303] ● paid-access data

[307] 1 Satellite Imagery
- ○ Google Satellite Imagery Layers datasources

FIG. 3

[401] Business Metadata
- company name
- primary address
- city, county, state, zip code
- phone number
- line of business
- website
- linkedin contact data
- credit score
- owns/rents

[402] Building Metadata
- building category
- parcel area (sq.Ft)
- building footprint area (sq.Ft)
- coverage ratio
- leed / energystar certifications
- zone
- building owner name, address
- property net value
- HVAC unit count, type
- rooftop unobstructed area

[403] Energy Demand Metadata
- annual demand (MWh/year)
- peak demand (kW)
- peak month
- peak in individual months (kW)
- peak hour in individual months
- peak-to-average load
- tariff

[404] Interconnection Metadata
- distance (ft)
- system name
- substation name
- circuit name
- i.c. generation (MW)
- i.c. load (MW)

[405] Permit Metadata
- permits issued
- permit job type
- permit issue date
- permit close date
- permit status
- permit job description metadata collected

FIG. 4

| USE CASE | SCALE | DESCRIPTION |
|---|---|---|
| [501] Utility DER Roadmap | Large | Assist utilities in structuring DER procurement and deployment |
| [502] Market Sizing | Medium | Assess energy load for multiple locations within defined region |
| [503] Customer Acquisition | Medium | Assess energy load and DER product compatibility for multiple locations within defined region |
| [504] Portfolio Customer Roadmap | Small | Assess energy load, DER product compatibility and savings for single-owner portfolio of locations | use cases

FIG. 5

[601] Building Load Inputs

- simulated building loads based on proprietary customer load data and reference load profiles
- simulated cooling loads based on analysis of HVAC data
- local historical weather data
- system size and annual production of existing photovoltaic installations

[602] HVAC Product Inputs

- maximum & minimum HVAC unit size
- maximum building height
- contract capacity per unit based on real utility contract
- dispatch profile based on utility contract
- performance gains and costs associated with replacing older HVAC units
- asset life based on vendor specifications

[603] Demand Response Product Inputs

- current pricing and rules for utility demand response program
- curtailable load assessment based on building use type
- events scheduled based on events record for 2012-2015
- contract duration

[604] Solar+Battery Product Inputs

- ac/dc ratio
- battery capacity
- energy density of photovoltaic installations
- availability of roof space based on automated rooftop analysis
- dispatch profile based on utility contract
- Solar+Battery PPA based on estimated savings and market conditions
- asset life based on vendor specifications

[605] Utility Tariff Inputs

- customer tariff estimation based on peak load assessment
- current utility tariff rates
- annual utility tariff escalator inputs

FIG. 6 automated network analysis automated rooftop analysis

GEOGRAPHIC MAP

9001

MAP CONTROLS 9002

ANALYSIS 1

9003

ANALYSIS 2

9004

ANALYSIS 3

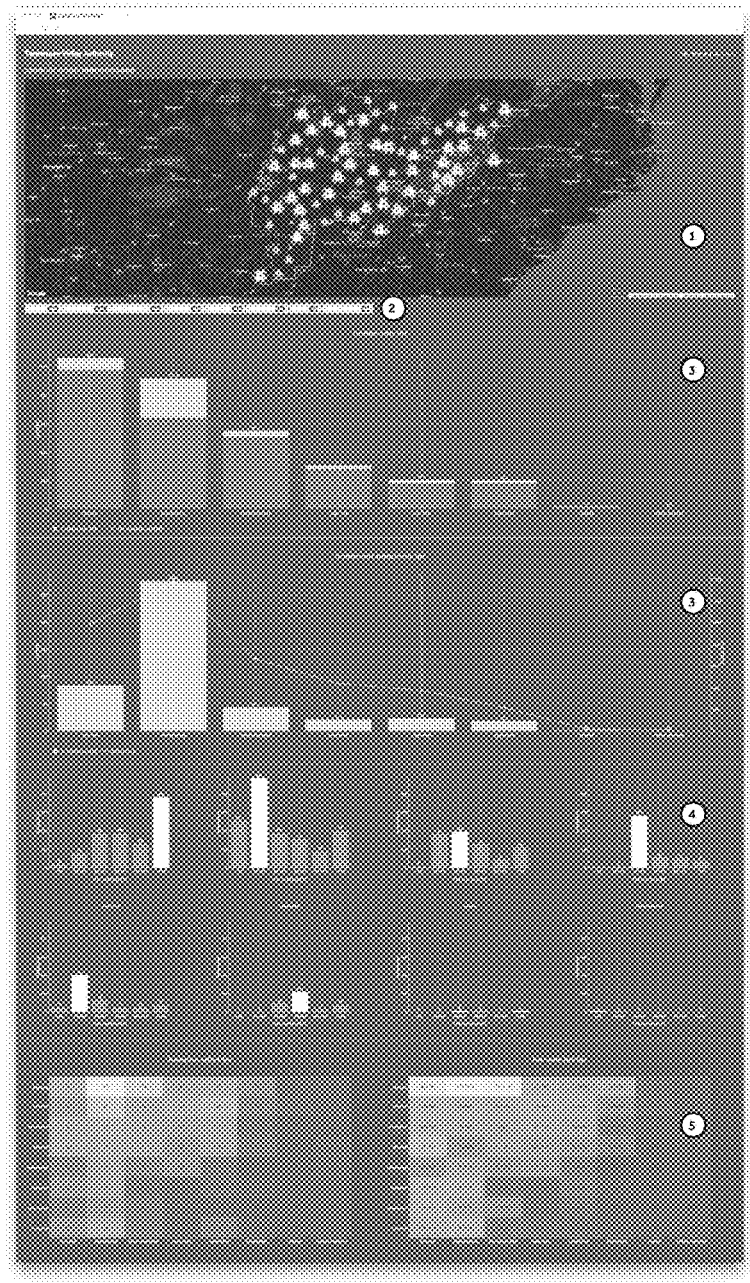

[901]
① interactive map
shows clustered location markers and peak load

[902]
② interactive map controls
allow switching location markers on and off by type

[903]
③ dynamic stacked graph
shows location count and breakdown of total and curtailable load between types

[904]
④ histograms
show breakdown of location count per peak load range per type

[905]
⑤ heatmaps
show breakdown of location count and peak load per city per type utility view

FIG. 9B

[1001] interactive map
shows locations and solutions deployed

[1002] interactive switches
control solutions to be considered

[1003] interactive sliders
control percentage of eligible locations to consider

[1004] sortable list
shows solutions deployed and savings per location

[1005] dynamic stacked graph
shows breakdown of savings by solution per location portfolio view

BIRD'S EYE VIEW

11001

INTERACTIVE CONTROLS

11002

INTERACTIVE SWITCHES
11003

ANALYSIS 1

11004

ANALYSIS 2

11005

ANALYSIS 3

[1101] dynamic bird's eye view map shows location

[1102] interactive switches control solutions to be considered

[1103] dynamic stacked graph shows monthly savings broken down by energy & demand charge

[1104] dynamic area graph shows expected 24-hour load profile and solution behavior

[1105] dynamic stacked graph shows annual savings over a 20-year period location view computer control system

METHOD AND SYSTEM FOR DETERMINING ENERGY MANAGEMENT STRATEGIES

CROSS-REFERENCE

This application claims the benefit of priority to Greece Application No. 20170100096, filed on Mar. 8, 2017, which is incorporated herein by reference in its entirety.

BACKGROUND

1. Field of the Invention

Exemplary embodiments relate generally to the field of energy management and in particular, to methods and systems for determining energy distribution strategies (e.g. deployment, management, use).

2. Description of Background Art

As energy providers strive to meet ever-increasing energy demands amidst environmental concerns and energy price volatility, business and residential consumers struggle to monitor and manage their energy usage and to keep energy costs down. The push towards greater energy conservation has led to the consideration and development of alternative energy sources and technologies for more efficient usage and improved management of energy consumption and distribution.

Technological advancements have also led to an increasing amount of generated and available data that can be used to better understand energy demands and consumption, including various types of customer (e.g. businesses, residences, and providers), location, and other energy-related data from various data sources. Certain solutions have been advanced that focus on deploying a particular alternative energy source on a particular type of structure, such as for example, determining the deployable area of a structure for solar energy production. But such solutions fall short of providing a comprehensive view of a customer or provider's energy profile. In addition, these solutions fail to provide an actionable and customized set of recommendations for the selection and placement of energy product offerings that would enable businesses, residences, and power providers to implement optimal energy management strategies.

Accordingly, to better and more adequately address the energy management, consumption, and distribution challenges faced by businesses, residences, and providers, a more technology-agnostic approach grounded in what currently exists in the built environment is needed that fully exploits the plethora of energy-related data available. Moreover, because energy usage is not static but is constantly changing and evolving due to environmental conditions and energy needs that can vary with location and time, what is needed to address this problem is an expert system and comprehensive end-to-end methodology that can automatically provide a customized set of energy product offerings customized to a particular site or customer's energy usage. In particular, the solution should be able to extract and analyze key information from various types of energy-related data and from various data sources, provide a comprehensive view of a customer's energy usage in one or multiple locations, and match that energy usage to a set of actionable recommendations for the selection and placement of energy product offerings. The solution should also help a power provider to understand not only where to place energy products to best meet demand, but also which energy products will most effectively address objective functions including peak usage, bill minimization, deferring upgrades, increasing efficiency, and/or energy conservation. The solution should provide a tool to help an end user anticipate and estimate the cost of implementation of a proposed energy solution and provide an optimal energy product installation strategy for cost savings and budgeting purposes. This level of empowerment does not currently exist for power providers or for business and residential consumers of energy.

Finally, such a system should have the ability to adjust to changing energy conditions and energy-related parameters, and should continue to evolve and improve its predictive models and recommendations over time as additional data particular to a customer, provider, or location is generated or becomes available. At least some of these objectives will be met by the exemplary embodiments disclosed herein.

SUMMARY

In one aspect, a Customer Acquisition method and system are provided to identify target customers and market sizing based on forecasting a customer's energy usage and determining a customized set of energy product offerings to satisfy a customer's energy needs. In another aspect, an Energy Resource Management method and system are provided to select and place energy products to meet the requirements of a particular objective function for a utility, power provider and/or customer. Objective functions can comprise of peak usage reduction, bill or cost minimization, deferred utility upgrades, emissions reduction, efficiency increases, and/or energy conservation. In still another aspect, an Energy Resource Management method and system are provided for anticipating and estimating implementation costs, optimizing installation strategy and product placement for the purposes of cost savings and budgeting.

In a first aspect, a Customer Acquisition method and system for providing a customized set of energy product offerings using an automated load forecasting engine comprises collecting one or more types of data from one or more data sources. The one or more types of data can be joined, related, and stored as data layers in a geospatial database. The data layers can comprise vector-based data layers and image-based data layers. Additionally, vector-based data layers can be collected or obtained through API querying and scraping while the image-based data layers can be collected or obtained through image processing analysis. The set of energy product offerings can be customized based on a particular customer's building or site, or for a given customer portfolio or set of buildings or sites.

The method and system can further provide or comprise an automated load forecasting engine that interfaces with the geospatial database and that can independently perform various steps. These steps include but are not limited to: (1) receiving the data layers from the geospatial database; (2) receiving one or more types of information from one or more information sources; (3) determining a set of simulation assumptions based on the received data layers and the one or more types of information; and (4) conducting an analysis of a prospective customer's building or portfolio of buildings based on the simulation assumptions, the received data layers, and/or image processing information, and the one or more types of information. The information received can comprise technical assessment, market assessment, and calibration data.

The analysis conducted by the automated load forecasting engine can further comprise one or more of the following:

(1) forecasting an energy load on the prospective customer's building or portfolio of buildings; (2) determining a compatibility score or building score for the prospective customer's building or for each building in a prospective customer's portfolio of buildings; (3) determining a customized set of energy product offerings based on the energy load and the building score or set of scores; and (4) determining a financial and technical assessment for the prospective customer's building or portfolio of buildings. The automated load forecasting engine can use various machine learning techniques or algorithms to conduct the analysis and to provide a prioritized list of target customers and a customized set of energy product offerings for each target customer. An interface for displaying the results of the analysis can also be provided. The interface can display for example, the forecasted energy load, the building score, the customized set of energy offerings, the simulation assumptions, the financial and technical assessment, and the prioritized list of target customers. The interface can enable a user to interact with the system to access the various data, information, analyses, and results.

In a second aspect, an Energy Resource Management method and system for managing the selection and placement of energy products for a single location or a network of locations using an automated load forecasting engine comprises collecting one or more types of data from one or more data sources. The one or more types of data can be joined, related, and stored as data layers in a geospatial database. The data layers can comprise vector-based data layers and image-based data layers. Additionally, vector-based data layers can be collected or obtained through API querying and scraping while the image-based data layers can be collected or obtained through computer vision analysis.

The method and system can further provide or comprise an automated load forecasting engine that interfaces with the geospatial database and that can independently perform various steps. These steps include but are not limited to: (1) receiving the data layers from the geospatial database; (2) receiving one or more types of information from one or more information sources; (3) determining a set of simulation assumptions based on the received data layers and the one or more types of information; and (4) conducting an analysis of a provider's network of buildings in a target area based on the simulation assumptions, the received data layers, and the one or more types of information. The information received can comprise technical assessment, market assessment, and calibration data.

The analysis conducted by the automated load forecasting engine can further comprise one or more of the following: (1) forecasting a distribution of loads within buildings and/or for one or more buildings in the target area; (2) determining a building type and industry for the one or more buildings in the target area; (3) determining the number of buildings for each building type and industry in the target area; (4) determining a customized set of energy product offerings for the one or more buildings in the target area; (5) determining a financial and technical assessment for the one or more buildings in the target area; and (6) estimating a load profile corresponding to an implementation of different energy product combinations for the one or more buildings in the target area. The automated load forecasting engine can use various machine learning techniques or algorithms to conduct the analysis. An interface for displaying the results of the analysis can also be provided. The interface can display for one or more buildings in a target area, the distribution of load corresponding to one or more of the buildings in the target area, the building type of one or more of the buildings in the target area, the number of buildings of a given building type in the target area, a customized set of energy product offerings for one or more buildings in the target area, the financial and technical assessment for the one or more buildings in the target area, and the load profile corresponding to an implementation of different energy product combinations for the one or more buildings in the target area. The interface can display a customized set of energy product offerings dependent on one or more objective functions of the platform. Objective functions can include ranges, thresholds, or cutoffs for peak usage, costs including energy bill costs, deferred upgrades to reduce blackouts, emissions reductions, improved or increased efficiency, and/or energy conservation. In addition, the interface can enable a user to interact with the system to access the various data, information, analyses, and results.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 3 shows an overview of various types of data sources that can be used in an exemplary embodiment.

FIG. 4 shows an overview of various types of energy-related metadata that can be collected in an exemplary embodiment.

FIG. 5 shows examples of use cases for the systems and methods in accordance with embodiments of the invention.

FIG. 6 shows exemplary inputs for assessing energy load and simulating performance and control decisions for various energy product offerings.

FIG. 9A shows an exemplary schematic of a utility view.

FIG. 9B shows an exemplary utility view of the user interface (UI).

FIG. 11A shows an exemplary schematic of a location view.

DETAILED DESCRIPTION

While various embodiments of the invention have been shown, and described herein, it will be obvious to those skilled in the art that such embodiments are provided by way of example only. Numerous variations, changes, and substitutions can occur to those skilled in the art without departing from the invention. It should be understood that various alternatives to the embodiments of the invention described herein can be employed.

A method and system are provided for forecasting energy usage for a prospective customer's site, building, or set of buildings and for determining a tailored set of energy product offerings to satisfy a customer's energy needs or achieve a specific objective function. In particular, by matching a customer's forecasted energy use and building characteristics with energy product qualifications, the method and system can be used to identify target customers likely to benefit from a tailored set of energy product offerings based on a prediction of the customer's energy needs and taking into account financial and utility criteria in determining the optimal energy product solution.

In one embodiment, a Customer Acquisition method and system are provided to identify target customers who are more likely to benefit and thus adopt a tailored set of energy product offerings. The system can output a prioritized list of target customers based on a prediction of the customer's energy needs and taking into account financial and utility criteria in determining the optimal energy product solution. To accomplish this, the system can generate models for performing backend analytic tasks to identify target customers, can predict the target customer's energy needs, and can use these models and predictions to determine a customized set of energy product offerings. In particular, the system can collect and integrate data on its backend, perform forecasting of energy load or usage using an automated machine-learning forecasting engine to analyze the data, and can determine recommendations for customized energy product offerings based on its data analysis and the forecasted energy load.

Figure 1:
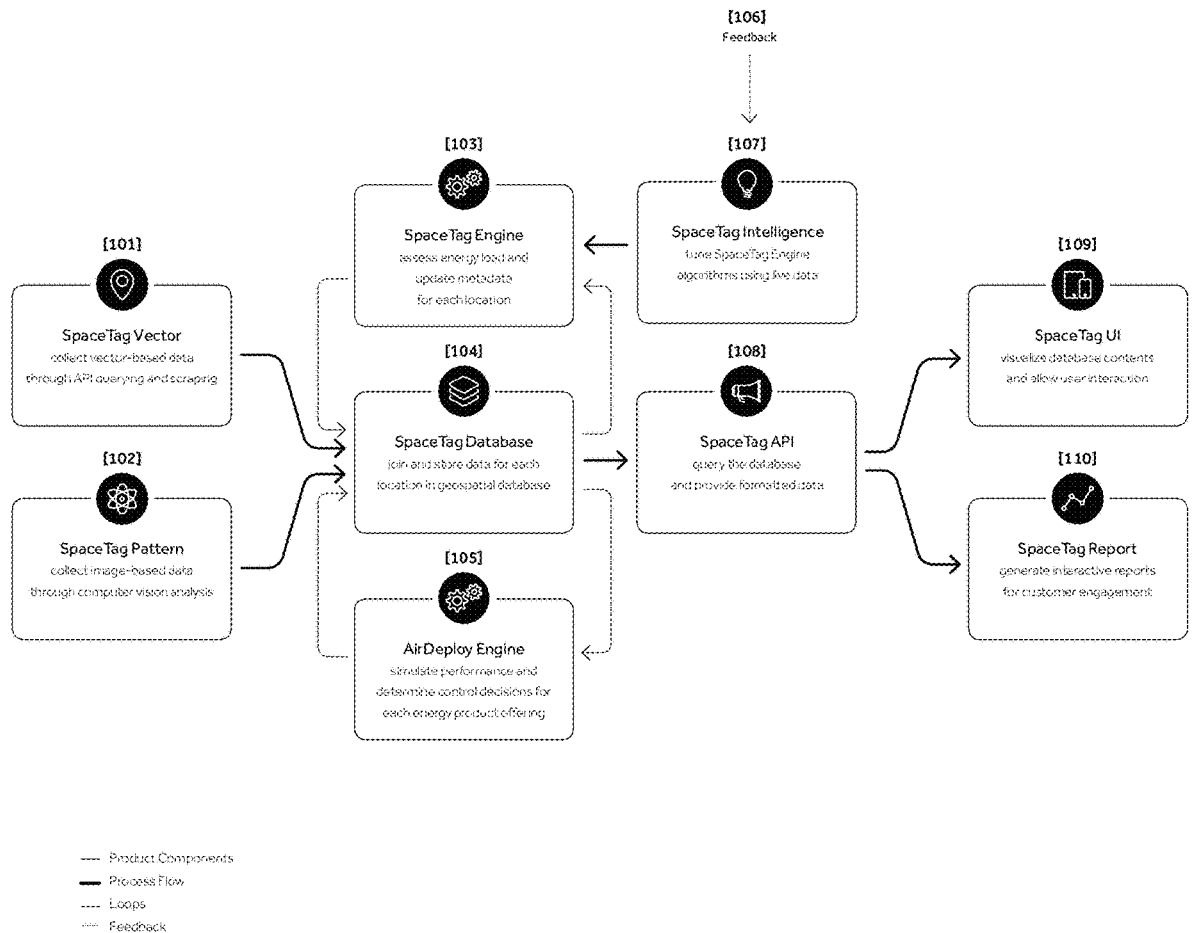
FIG. 1 shows an exemplary overview of a system for assessing energy load, as well as simulating performance and control decisions for various energy product offerings.

FIG. 1 shows an exemplary overview of a system for assessing energy load as well as simulating performance and control decisions for various energy product offerings. The system can comprise various functional components such as SpaceTag Vector 101, SpaceTag Pattern 102, SpaceTag Engine 103, SpaceTag Database 104, AirDeploy Engine 105, SpaceTag Intelligence 107, SpaceTag API 108, SpaceTag UI 109, and SpaceTag Report 110. In addition, feedback 106 may be provided to the system. Any of these functional components may be optional, or provided with additional functional components. The functions of two or more functional components may be combined into a single functional component, or functions of a single functional component may be split into multiple functional components. The functional components may be arranged and communicating with one another as illustrated, or other variations may be possible in accordance with different embodiments of the invention. The functional components may be implemented with aid of any computer controls systems or components thereof as described elsewhere.

The system in FIG. 1 can collect and process various types of data from a variety of sources. SpaceTag Vector 101 can generate or collect vector-based layers through application programming interface (API) querying and scraping. The vector-based layers may relate to a geographical area. SpaceTag Pattern 102 can generate or collect image-based data layers through computer vision analysis. The image-based data layers may relate to a geographical area. The computer vision analysis may be of imagery captured of the geographical area. The imagery may be captured with aid of one or more imaging devices (e.g., cameras). The imaging devices may be supported with aid of aerial devices or satellites. Data layers from SpaceTag Vector 101 and SpaceTag Pattern 102 can be joined, related, and stored in SpaceTag Database 104, which can be a geospatial database. Vector-based data layers and image-based data layers for the same geographical region may be associated with one another in memory. SpaceTag Vector 101 and SpaceTag Pattern 102 can be automatically updated and refreshed on a regular basis without interference.

SpaceTag Engine 103 can assess the energy load and/or update metadata for each location in the geospatial database. One or more energy product offerings (i.e. solutions) may be available for one or more buildings at one or more locations in the geospatial database. The AirDeploy Engine 105 can simulate performance and/or determine control decisions for each energy product offering for each individual building, or for a set of buildings at each location marked in the geospatial database. Any description herein of a location or building may refer to a parcel of land or any type of structure, fully enclosed structures, partially enclosed structures, structures with a roof, single-floor structures, multi-floor structures, residential buildings, commercial buildings, or any other types of structures. Any description of a location may or may not include a single building or a set of buildings. Buildings may include, but are not limited to, homes, offices, warehouses, skyscrapers, stores, schools, medical facilities, government facilities, or any other type of buildings. Energy products can be divided into products that generate energy, products that store energy, and products that control or shift energy demand. Power generation energy products can comprise renewable energy systems. In some examples power generation energy products can include but are not limited to photovoltaic, geo-thermal, wind or hydroelectric energy systems. For instance, energy products can include solar panels, solar collectors, wind turbines, hydroelectricity plants, geothermal heat pumps, ground-coupled heat exchangers, or other types of renewable energy systems. Power storage energy products can include but are not limited to electrochemical energy storage, thermal energy storage or products that control or modify energy usage, including demand response, load control, and/or heating and cooling system control.

Figure 2A:
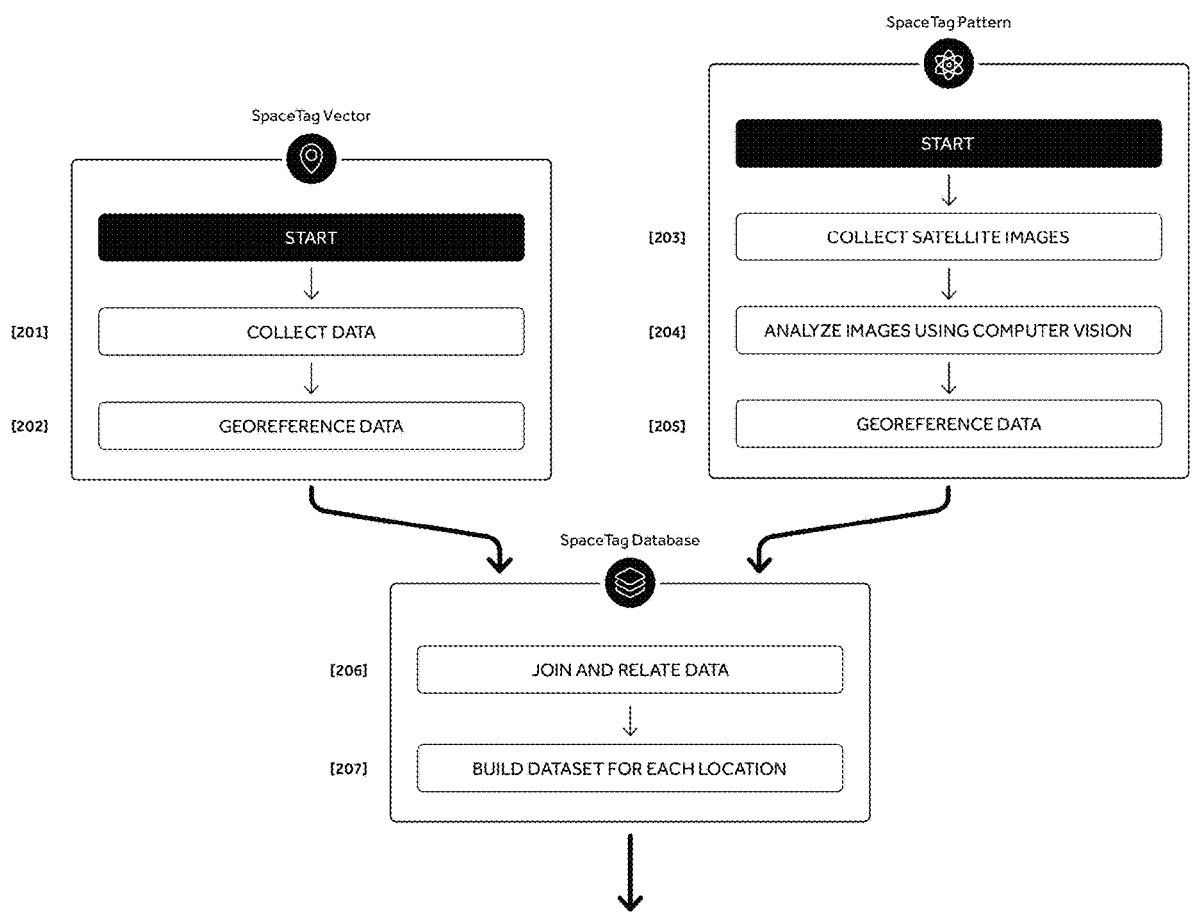
FIGS. 2A-2D show an exemplary product overview and process for assessing energy load for vector and image based data, as well as storing the data based on geolocation and providing the stored data to a user using an application programming interface (API).
Figure 2B:
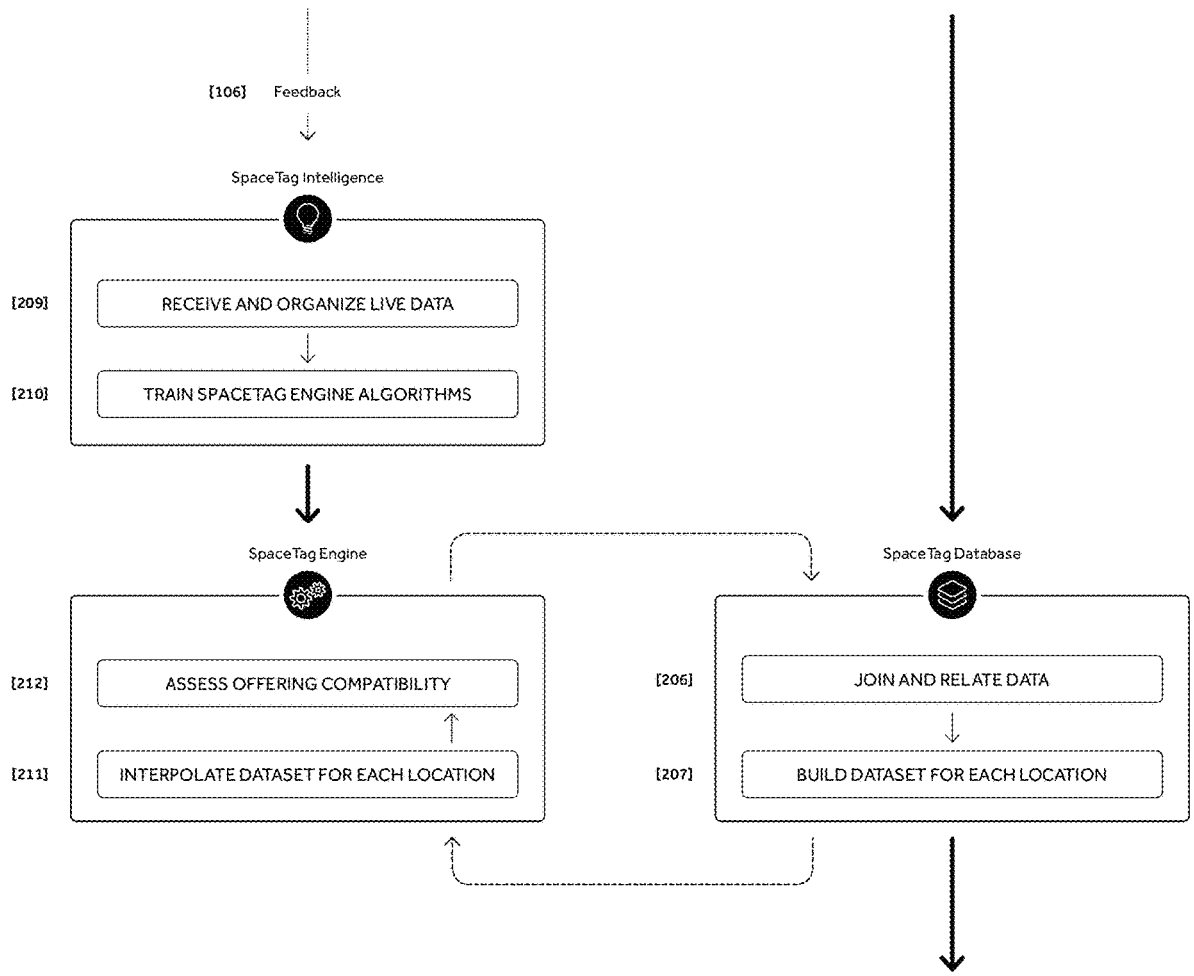
Figure 2C:
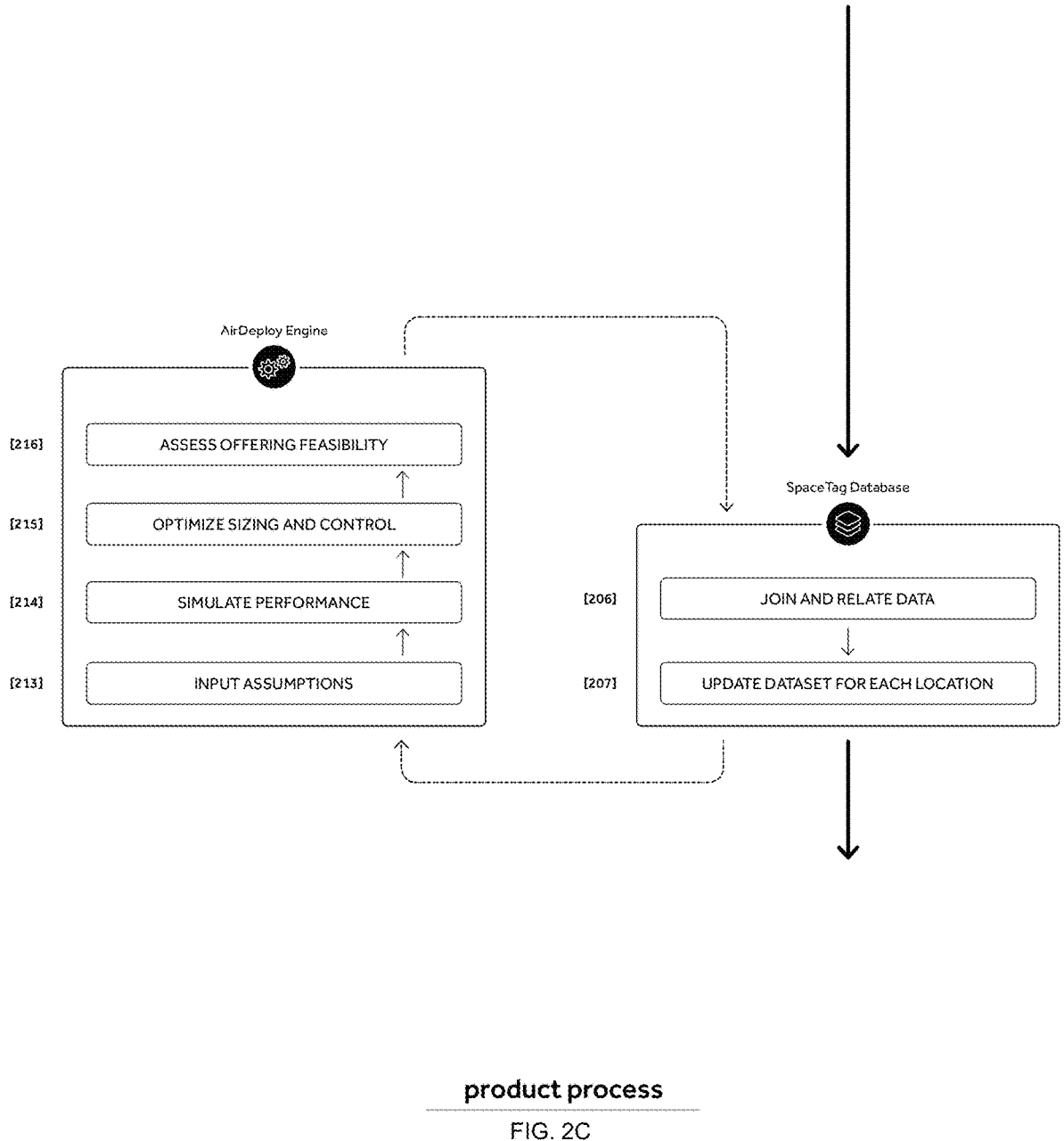

The AirDeploy Engine 105 can perform the steps of inputting assumptions, steps for simulating model performance, steps for optimizing sizing and control, and/or steps for assessing offering feasibility, as illustrated in FIG. 2C.

Inputting assumptions 213 steps can comprise loading location compatibility information, and/or loading detailed product parameters form a product database or databases that define how the asset operates. The AirDeploy Engine may receive and structure data describing host load, utility rates, asset parameters, and/or local weather. Simulating performance 214 steps can comprise making estimations or predictions by modeling asset performance over a period of time, accounting for location characteristics such as weather, regulatory environment, utility tariff, physical space, market inputs, and/or other variables. The AirDeploy Engine may assess a proposed energy asset's impacts on net load, given asset size and dispatch, and the resulting impact on technical and financial outcomes. Optimizing sizing and control 215 steps can comprise collecting the user's desired outcome in the form of an objective function and/or solving an optimization problem to determine the optimal asset sizing and asset operations to maximize that objective function. The AirDeploy Engine may determine asset sizing and controls choices to maximize or increase user-specified technical and financial goals, using convex optimization and other optimization algorithms. Assessing offering feasibility 216 steps can comprise evaluating the impact of a product or set of product offerings on customer savings, utility goals, and/or other key metrics, as well as assessing whether or not a given location meets defined criterion for going forward with a particular project. For instance, the AirDeploy Engine may assess whether installing the proposed technology at a particular location meets the user's threshold for building the project. If a location is feasible then a customized product offering for that location may be provided.

SpaceTag Intelligence 107 can tune the SpaceTag Engine algorithms using live data obtained from feedback 106. Feedback 106 can comprise data received through an API-based pipeline to calibrate the system including, for example, data regarding the accuracy of the forecasts performed and data assessed by the SpaceTag Engine 103. Such calibration data processed by SpaceTag Intelligence 107 can be used to improve the SpaceTag Engine's 103 accuracy (e.g. precision and recall).

SpaceTag Engine 103 can use machine learning techniques and algorithms to perform forecasting and prediction based on various data and information. In particular, the SpaceTag Engine 107 can combine Technical Assessment, Market Assessment, data received from the SpaceTag Database 104, as well as feedback and calibration data 106 processed from SpaceTag Intelligence 107, to predict or forecast the energy load on a prospective customer's building. SpaceTag Engine 103 can also consider a building's geometry and other building characteristics. The SpaceTag Database 104 can join and store data from the SpaceTag Engine 103 and the AirDeploy Engine 105 and SpaceTag Database can be available for query by the SpaceTag API 108. The SpaceTag API 108 can output into SpaceTag UI 109 which can visualize the database contents and allow user interaction, alternatively or in concert the SpaceTag API 108 can output into SpaceTag Report 110 which can generate interactive reports for customer engagement. Report or visualization of database contents can comprise recommendations for one or more energy products for a building or portfolio of buildings; they can further provide a Financial and Technical Assessment.

FIGS. 2A-2D show an exemplary product overview and process for assessing energy load for vector and image based data, as well as storing the data based on geolocation and providing the stored data to a user using an API.

Figure 2D:
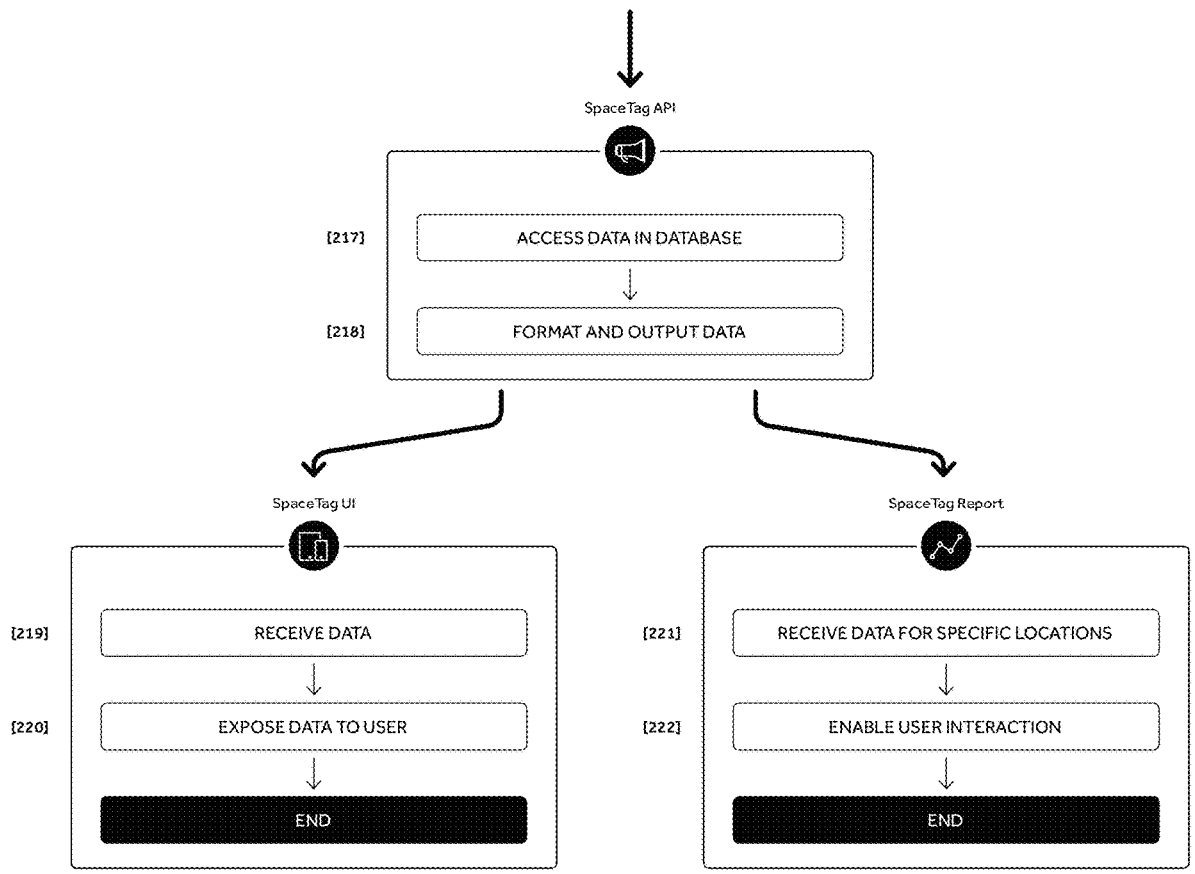

FIG. 2A, FIG. 2B, and FIG. 2D show an exemplary overview of a system for assessing energy load as well as simulating performance and control decisions for various energy product offerings and an exemplary product overview and process for assessing energy load for vector and image based data, as well as storing the data based on geolocation and providing the stored data to a user using an API. SpaceTag Vector 101 can collect vector-based data 201 through connecting to databases and/or APIs (e.g., API querying) and scraping or harvesting raw data (e.g. data about a specific region). The data can then undergo georeferencing 202. Georeferencing for non-geometric data, such as lists of addresses, can use geocoding algorithms to attach coordinate pairs (latitude and longitude) to the data. Georeferencing for shape-based data can comprise extracting geometric information as a collection of coordinate pairs.

As illustrated in FIG. 2A, SpaceTag Pattern 102 can collect or download image-based data, e.g. satellite images of a specific region 203, and/or analyze the images using computer vision analysis 204 before georeferencing the data 205. Computer vision analysis can comprise using computer vision algorithms to assess geometric characteristics of building rooftops (e.g. unobstructed area, HVAC units, etc.). Georeferencing can comprise extracting the geometric information of assessed rooftops as a collection of coordinate pairs. In the SpaceTag Database 104, the one or more types of data can be joined and related 206, then stored as data layers (e.g. in a geospatial database) with a dataset built for each location 207. Joining and relating data can comprise receiving raw data from SpaceTagVector and SpaceTag Pattern, performing spatial joins on the data based on their geometric information, and/or performing table joins on the data based on attribute values. Building a dataset for each location can comprise formatting the joined data, identifying unique locations (based on their coordinate pairs), and/or attaching formatted data as metadata to unique locations. The data layers can comprise vector-based data layers and image-based data layers.

FIG. 2B demonstrates that feedback 106 can be provided to SpaceTag Intelligence 107, which can inform the SpaceTag Database 104 through the SpaceTag Engine 103. Feedback can be provided to the SpaceTag Intelligence 107 which tunes the SpaceTag Engine algorithms using live data; data can be received by SpaceTag Intelligence 209 which can then trains the SpaceTag Engine Algorithms 210. The receiving and organizing of live data by SpaceTag Intelligence can comprise receiving real-world feedback, importing desired input variables and/or output variables from the SpaceTag Database, as well as optionally associating data points (e.g. input and output) via location and timestamp. Training the SpaceTag Engine algorithm can comprise training various machine learning algorithms using live data, evaluating accuracy of different models using various statistics (e.g. precision and recall, using receiver operating characteristics (ROC), area under curve (AUC), and/or other metrics), choosing the best algorithm, feature set, and fit parameters based on a combination or combinations of statistics, and/or loading these algorithms in the SpaceTag Engine 103 for use in interpolation. The trained SpaceTag Algorithms can then be used in the SpaceTag Engine 103. Data, for example unlabeled data, from the SpaceTag Database 104 that has been joined and related 206 and built into a dataset for each location 207 can then sent from the SpaceTag Database 104 into the SpaceTag Engine 103 which can interpolate the dataset for each location 211 and assess offering compatibility 212, before returning the data (e.g. the data along with an offering or suggested offering, or energy load estimation) back to the SpaceTag Database 104. Interpolation of the dataset for each location can comprise accessing the database and collecting relevant data for each location and locations that share similar attributes with it. Interpolations can be performed to build a complete dataset for each location. Assessing offering compatibility can comprise steps for using relevant attributes to assess offering compatibility for each location, and steps for calculating a compatibility score per offering for each location.

FIG. 2D illustrates steps of the method for enabling a SpaceTag API 108 to query the SpaceTag Database 104 for presenting data from the database in a SpaceTag UI 109 or a SpaceTag Report 110. The SpaceTag API 108 can access data 217 in the SpaceTag database 104 and format as well as output the data 218. Accessing data in the database can comprise queries to the SpaceTag database given a set of criteria (e.g. geolocation, bounding box, building features, business owner, etc.), search queries can be as broad or granular as necessary. Formatting and outputting of data can be performed after the relevant data has been retrieved from the database(s). The resulting data records can be formatted per the incoming request (e.g. JSON for the SpaceTag UI, CSV for direct downloads, etc.) The formatted and output data can be fed out in the SpaceTag UI 109 or the SpaceTag Report 110. The SpaceTag UI 109 can receive the data 219 and expose the data to the user 220. After sending an API request, the SpaceTag UI can receive data back in the desired format and parse the response for further use, before exposing or presenting the data to the user on a user interface. Once a response is parsed, the SpaceTag UI can display each data point in a useful manner, e.g., geolocations as a pin on a map, time series data as graphs/plots, and so forth. The SpaceTag Report 110 can receive data for specific locations 221 and enable user interaction 222 with the data. After sending an API request, the SpaceTag Report can receive data on specific locations in the desired format, and parse the response for further use. SpaceTag Report can enable user interaction by visualizing the data in a web-based manner that allows the user to select, filter, and/or sort locations by a variety of metrics.

FIG. 3 shows an overview of data sources available in an exemplary embodiment. As shown in FIG. 3, various data can be collected from data sources generally categorized as Databases 304, Network Maps 306, Geospatial Features 305, or Satellite Imagery 307. The various data in these data sources can also be categorized as open-access 301, licensed data (e.g., NRG-licensed data) 302, or paid-access data 303. In some instances, identification and authentication may be required to access data. Alternatively, the data may be freely accessed. The data sources in Databases 304 can further comprise an Energy Star Certifications database, LEED Certification database, LinkedIn database, Google Places database, NRG Saleforce database, heating ventilation and air conditioning (HVAC) surveys, Blue Pillar database, Bloomberg Credit Rating database, and Location-Specific Building Permits. The data sources in Network Maps 306 can further comprise Utility Circuit Mapping, Utility Substation Mapping and Location-Specific Street Network. The data sources in Geospatial Features 305 can further comprise OpenStreetMaps Data, Utility Service Territory Data, Location-Specific Zoning Data, Location-Specific Parcel Data and Location-Specific Building Data. The data sources in Satellite Imagery 307 can further comprise SpaceTag Pattern Layers and Google Satellite Imagery Layers.

FIG. 4 shows an overview of various types of energy-related metadata that can be collected. The types of data collected can comprise business data 401, building data 402, energy demand data 403, interconnection data 404 or permit data 405. Business data 401 can comprise company name, primary address, city, county, state, zip code, line of business, phone number, website, owns/rent, credit score, or LinkedIn contact data. Building data 402 can comprise building category, parcel area, building footprint area, coverage ratio, leed/energystar certifications, zone, building owner name and address, property net value, HVAC unit count and type, or rooftop unobstructed area. Energy demand data 403 can comprise annual demand, peak demand, peak month, peak in individual months, peak hour in individual months, peak-to-average load, or tariff data. Interconnection data 404 can comprise information about the distance to grid, system name, substation name, circuit name, integrated circuit (i.c.) generation, i.c. load, delivery hour range start, or deliver hour range end. Permit data 405 can comprise information about permits issued, permit job type, permit issue date, permit close date, permit status, or permit job description.

FIG. 5 illustrates that the herein disclosed systems and methods have broad application and can be configured and/or adapted for use in distinct applications. In some instances, the systems and methods disclosed herein can be applied to generate a Utility Distributed Energy Resource ("DER") Roadmap 501. Utility DER road mapping applications can comprise large scale use and assist utilities in structuring DER procurement and deployment 501. In other instances, the systems and methods disclosed herein can be used to develop market Market Sizing 502. Market sizing applications can comprise assessing energy load for multiple locations within a defined region 502. In alternative embodiments, the herein disclosed systems can be used for Customer Acquisition 503. Customer acquisition applications can comprise assessing energy load and DER product compatibility for multiple locations within a defined region 503. In additional embodiments, the herein disclosed systems can be used to generate a Portfolio Customer Roadmap 504. Portfolio customer Road mapping applications can comprise assessing energy load, and DER product compatibility and savings estimations for single-owner portfolio locations 504.

FIG. 6 illustrates exemplary input data and assumptions. Such input data and/or assumptions can be processed by the AirDeploy Engine 105 in the product overview FIG. 1. Assumptions can include building load assumptions 601, HVAC Product Inputs 602, Demand Response Product Inputs 603, Solar+Battery assumptions 604, and Utility Tariff Inputs 605. These assumptions can be utilized in an AirDeploy module, or input into a system through an AirDeploy Engine that simulates performance and determines control decisions for each energy product offering. Input data and/or assumptions may be automatically collected and/or generated with aid of one or more processors. Input data and/or assumptions may be determined based on data collected from one or more data sources. Optionally, input data and/or assumptions may be provided via an input by a user via a user interface.

Figure 7:
FIG. 7 shows a zoomed-in view of an automated network analysis of a target area for an exemplary embodiment.

FIG. 7 shows a zoomed-in view of a virtual model of a target area that can be displayed on a user interface, such as the SpaceTag UI 109. The SpaceTag Engine 103 can identify the closest utility circuit segment 701. This may include the closest utility circuit segment to a particular location. The location may or may include a building or a set of buildings. Such analysis may be conducted for multiple locations. The SpaceTag Engine may identify the closest utility circuit segment by displaying all locations and all utility circuit segments, iterating over each location and/or matching to the closest utility circuit segment. The SpaceTag Engine 103 can calculate distance 702 between a location and the closest utility circuit segment and display the distance in a unit of measure, such as feet or meters. In one example, a shortest distance curve may be drawn between a location and a closest utility circuit segment, and displayed in a unit of measure. Such actions can be performed by the SpaceTag Engine in an automated fashion without requiring human intervention.

Figure 8:
FIG. 8 shows a zoomed-in view of an automated rooftop analysis of a target area for an exemplary embodiment.

FIG. 8 shows a zoomed-in view of a target area that can be displayed on the SpaceTag UI 109. SpaceTag Pattern 102 can identify rooftop regions 801 to categorize each region of the rooftop as a potential place to deploy solar panels or not. SpaceTag Pattern 102 can use the size and shape of the available area assessed in 801 to calculate the capacity of solar installable on the roof Image processing/computer vision techniques may be utilized to perform such identification and/or assessment. Such techniques may be able to identify a border of a roof or other structure in an automated fashion. Based on the border, the area of the available area may be calculated. The area and shape of the roof, and the area(s) and shape(s) of prospective solar panels may be used to determine one or more possible solar installation configurations. Based on the possible solar installation configurations, the capacity for solar that may be installed on the roof may be calculated. In some instances, several possible solar installation configurations may be considered and/or iterated to find the highest or an increased solar capacity. Such actions can be performed by the SpaceTag Pattern in an automated fashion without requiring human intervention.

Figure 10A:
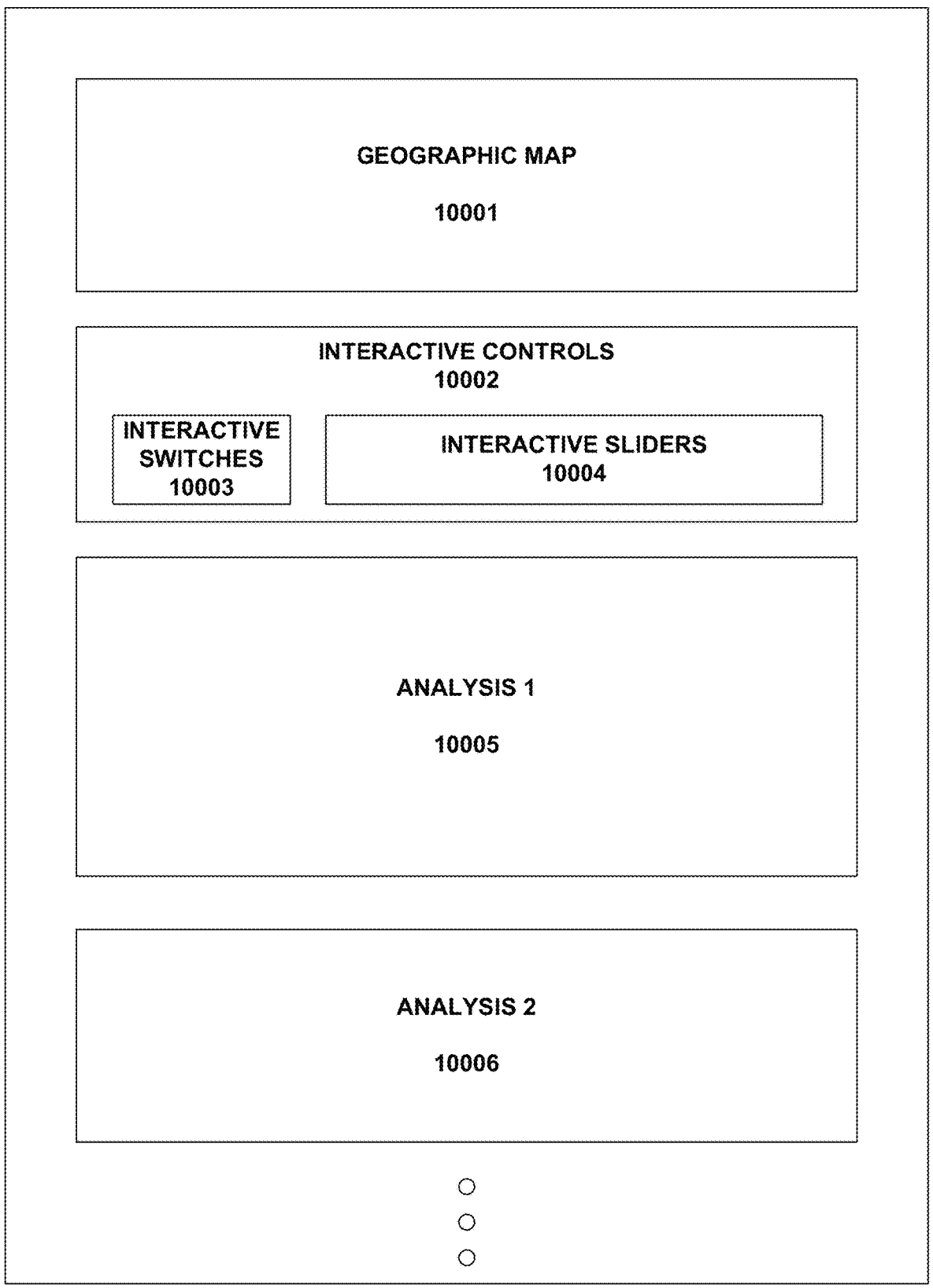
FIG. 10A shows an exemplary schematic of a portfolio view.
Figure 10B:
FIG. 10B shows an exemplary portfolio view of the UI.
Figure 11B:
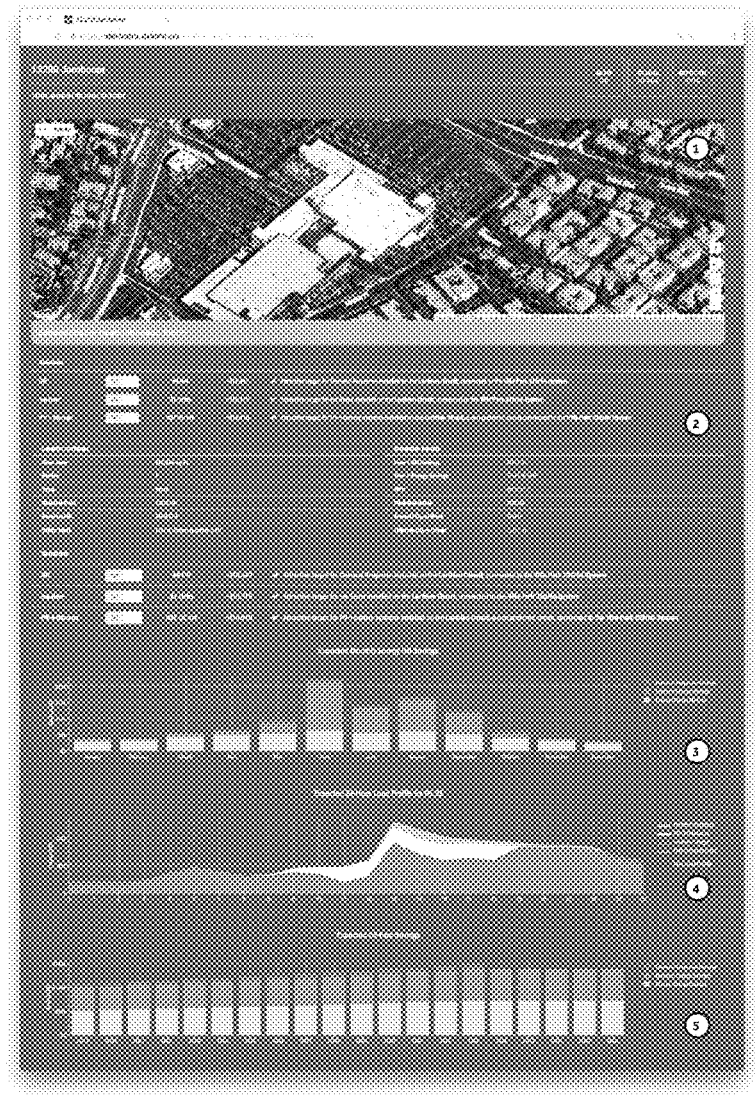
FIG. 11B shows an exemplary location view of the UI.

FIG. 9B, FIG. 10B and FIG. 11B illustrate exemplary presentations of data provided by the systems and methods as presented herein. For instance, the presentations of data may be provided by the SpaceTag UI 109 illustrated in FIG. 1. The presentations of data may be shown on a display. The presentations of data may be shown on a user interface. The presentations of data may permit user interaction.

FIG. 9A shows an example of a schematic of a utility view. The utility view may comprise a geographic map 9001, one or more map controls 9002, and one or more sets of analysis of load data for locations shown on the map 9003, 9004, 9005. The geographic map 9001 may show an area. Various location markers and peak load may be illustrated. In some instances, the locations may be shown as clusters. In some instances, larger clusters may be correlated with larger location markers. Location markers may represent locations of different types. The location markers of different types may or may not be visually distinguishable. For example, different colors or types of markers may be used. A user may or may not directly interact with the geographic map. For example, a user may directly change the area shown on the map by dragging and clicking. In some instances, a user may interact with the map via one or more map controls 9002. The one or more map controls may affect an area shown, by permitting a user to zoom in or zoom out, or adjust a location covered by the map. The one or more map controls may affect the data shown on the map. For example, the one or more map controls may switch on or off different location markers by type. The one or more map controls may affect categories of data that are display or that are not displayed. The one or more map controls may affect parameters of the data that is displayed. The one or more map controls may set filters or thresholds about what types of data are displayed. The map controls may be located on or near the geographic map. The map controls may be within the geographic map area, or may be adjacent to the geographic map. For example, the map controls may be beneath, above, or to a right or left side of the geographic map.

The utility view may also show one or more sets of analysis of load data for locations shown on the map. Any number of sets of analysis may be provided. For example, a first set of analysis 9003 may be shown beneath the geographic map. A second set of analysis 9004 may optionally be shown beneath the first set of analysis. The third set of analysis 9005 may be shown beneath the second set of analysis. Any number of sets of analysis may be provided in their own corresponding region. The regions may be shown vertically adjacent to one another, horizontally adjacent to one another, in a grid, or any other format. A user may be able to interact with one or more areas of the utility view. The user may or may not interact directly with the sets of analysis. In some embodiments, adjusting the geographic map or one or more map controls may affect the information shown on the sets of analysis. The various sets of analysis may include analysis of different types of information, or the same types of information. For example, the various sets of analysis may include analysis of load. The various sets of analysis may analyze different aspects of load, such as location count and breakdown of total and curtailable load between types, breakdown of location count per peak load range per type, and/or breakdown of location count and peak load per city per type. The various sets of analysis may include the same type of data analysis display or different types of data analysis display. For example, they may all show the same type of graph or chart, or may show different types of graphs or charts, including but not limited to, stacked graphs, histograms, heat maps, pie charts, line graphs, lists, area graphs, tables, pictograms, or any other type of graph or chart.

FIG. 9B illustrates a utility view of the SpaceTag UI 109. The utility view of the SpaceTag UI 109 can comprise of an interactive map 901, interactive map controls 902, dynamic stacked graphs 903, histograms 904, and/or heat maps 905. An interactive map 901 can show clustered location markets and peak load. Interactive map controls 902 can allow switching location markers on and off by type. Dynamic stacked graphs 903 can show location count and breakdown of total and curtailable load between types. Histograms 904 can show the breakdown of location count per peak load range per type. Heat maps 905 can show a breakdown of location count and/or peak load per location (e.g., per region, state, province, city, town, etc.) per type. Any of the elements provided on the UI may be optional or displayed in addition to other elements. The locations of the elements may be provided as illustrated, or may vary in different embodiments.

FIG. 10A shows an example of a schematic of a portfolio view. The portfolio view may comprise a geographic map 10001, one or more interactive controls 10002, and one or more sets of analysis of financial data for locations shown on the map 10005, 10006. The geographic map 10001 may show an area. Various location markers and solutions deployed at those locations may be illustrated. Locations may or may not be shown as clusters. Location markers may or may not represent locations of different types, or solutions of different types that may or may not be visually distinguishable. A user may or may not directly interact with the geographic map. For example, a user may directly change the area shown on the map by dragging and clicking. In some instances, a user may interact with the map via one or more interactive controls 10002. Any number or type of interactive control may be provided. For example, interactive switches 10003 and interactive sliders 10004 may be employed. The interactive controls may provide a binary input (e.g., switches, on-off buttons, etc.) or a gradated input (e.g., sliders, scales, etc.). The one or more interactive controls may affect an area shown, by permitting a user to zoom in or zoom out, or adjust a location covered by the map. The one or more interactive controls may affect the data shown on the map. For example, the one or more interactive controls may switch on or off different solutions to be considered for the various locations. The one or more interactive controls may control a percentage of eligible locations to consider. The one or more interactive controls may affect parameters of the data that is displayed. The one or more interactive controls may set filters or thresholds about what types of data are displayed. The interactive controls may be located on or near the geographic map. The interactive controls may be within the geographic map area, or may be adjacent to the geographic map. For example, the interactive controls may be beneath, above, or to a right or left side of the geographic map.

The portfolio view may also show one or more sets of analysis of load data for locations shown on the map. Any number of sets of analysis may be provided. For example, a first set of analysis 10005 may be shown beneath the geographic map. A second set of analysis 10006 may optionally be shown beneath the first set of analysis. Any number of sets of analysis may be provided in their own corresponding region. The regions may be shown vertically adjacent to one another, horizontally adjacent to one another, in a grid, or any other format. A user may be able to interact with one or more areas of the portfolio view. The user may or may not interact directly with the sets of analysis. In some embodiments, adjusting the geographic map or one or more interactive controls may affect the information shown on the sets of analysis. The various sets of analysis may include analysis of different types of information, or the same types of information. For example, the various sets of analysis may include analysis of energy solutions. The various sets of analysis may analyze different aspects of energy solutions, such as solutions deployed and savings per solution, and/or breakdown of savings by solution per location. The various sets of analysis may include the same type of data analysis display or different types of data analysis display. For example, they may all show the same type of graph or chart, or may show different types of graphs or charts, including but not limited to, stacked graphs, histograms, heat maps, pie charts, line graphs, lists, area graphs, tables, pictograms, or any other type of graph or chart. The sets of analysis may include static or dynamic graphs or charts.

FIG. 10B illustrates a portfolio view of the SpaceTag UI 109 illustrated in FIG. 1. The portfolio view of the SpaceTag UI 109 can comprise an interactive map 1001, interactive switches 1002, interactive sliders 1003, sortable list or lists 1004, and a dynamic stacked graph 1005. An interactive map 1001 can show locations and the solutions deployed. Interactive switches 1002 can controls solutions to be considered. Interactive sliders 1003 can control the percentage of eligible locations to consider. A sortable list 1004 can show any solutions deployed and estimated savings per location. A dynamic stacked graph 1005 can show a breakdown of estimated savings per solution per location.

FIG. 11A shows an example of a schematic of a location view. The location view may comprise a bird's eye view of a location 11001, one or more interactive controls 11002, and one or more sets of analysis of financial data for locations shown on the map 11004, 11005, 11006. The bird's eye view 11001 may show a real or virtual image of a particular location. The view may be captured with aid of aerial or satellite photography. The images may be collected directly or indirectly from a source that captures the image. The view may be a dynamic view. A user may or may not directly interact with the bird's eye view. For example, a user may directly change the area shown on the bird's eye view by dragging and clicking. In some instances, a user may interact with the bird's eye view via one or more interactive controls 10002. Any number or type of interactive control may be provided. For example, interactive switches 10003 may be employed. The one or more interactive controls may affect an area shown, by permitting a user to zoom in or zoom out, or adjust a location covered by the bird's eye view. The one or more interactive controls may affect the data shown on the map. For example, the one or more interactive controls may switch on or off different solutions to be considered for the location shown on the view. The one or more interactive controls may affect parameters of the data that is displayed. The one or more interactive controls may set filters or thresholds about what types of data are displayed. The interactive controls may be located on or near the bird's eye view. The interactive controls may be within the bird's eye view area, or may be adjacent to the bird's eye view area. For example, the interactive controls may be beneath, above, or to a right or left side of the bird's eye view area.

The location view may also show one or more sets of analysis of load data for locations shown on the map. Any number of sets of analysis may be provided. For example, a first set of analysis 11004 may be shown beneath the bird's eye view. A second set of analysis 11005 may optionally be shown beneath the first set of analysis. A third set of analysis 11006 may optionally be shown beneath the second set of analysis. Any number of sets of analysis may be provided in their own corresponding region. The regions may be shown vertically adjacent to one another, horizontally adjacent to one another, in a grid, or any other format. A user may be able to interact with one or more areas of the portfolio view. The user may or may not interact directly with the sets of analysis. In some embodiments, adjusting the geographic map or one or more interactive controls may affect the information shown on the sets of analysis. The various sets of analysis may include analysis of different types of information, or the same types of information. For example, the various sets of analysis may include analysis of savings. The various sets of analysis may analyze different aspects of energy solutions, such as monthly savings broken down by energy and demand charge, expected 24-hour load profile and solution behavior, and/or annual savings over a 20 year period. The various sets of analysis may include the same type of data analysis display or different types of data analysis display. For example, they may all show the same type of graph or chart, or may show different types of graphs or charts, including but not limited to, stacked graphs, histograms, heat maps, pie charts, line graphs, lists, area graphs, tables, pictograms, or any other type of graph or chart. The sets of analysis may include static or dynamic graphs or charts.

FIG. 11B illustrates a location view of the SpaceTag UI 109. The location view can comprise a dynamic bird's eye view 1101, interactive switches 1102, dynamic stacked monthly graph 1103, dynamic area graph 1104, and dynamic stacked annual graph 1105. The dynamic bird's eye view 1101 can show the map location. The interactive switches 1102 can control solutions to be considered. A dynamic stacked monthly graph 1103 can depict monthly savings broken down by energy and demand charge. A dynamic area graph 1104 can illustrate the expected 24-hour load profile and solution behavior. A dynamic stacked annual graph 1105 can display annual savings over time (e.g., months, quarters, years, decades), for example a 20-year period.

Computer Control Systems

Figure 12:
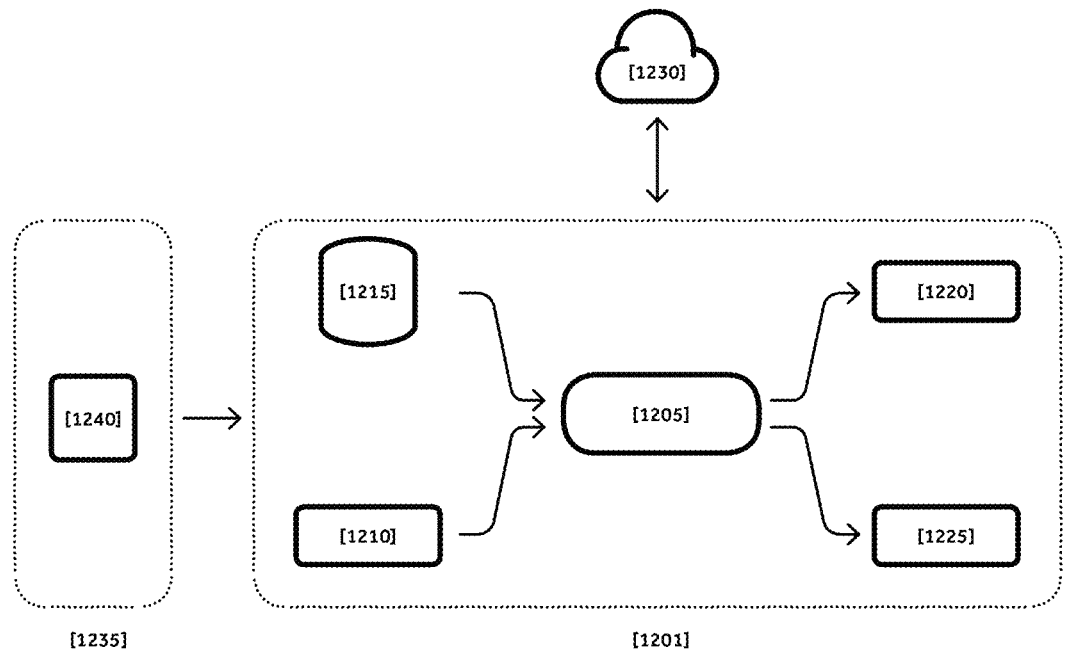
FIG. 12 shows an exemplary computer control system that is programmed or otherwise configured to implement methods provided herein.

The present disclosure provides computer control systems that are programmed to implement methods of the disclosure. FIG. 12 shows a computer system 1201 that is programmed or otherwise configured to: (1) identify target customers based on forecasting a customer's energy usage and determine an optimized set of energy product offerings to satisfy a customer's energy needs; (2) select and place energy products for power providers seeking to meet peak usage requirements; and (3) anticipate and estimate implementation costs and optimize installation strategy and product placement for the purposes of cost savings and budgeting.

The computer system 1201 can be an electronic device of a user or a computer system that is remotely located with respect to the electronic device. The electronic device can be a mobile electronic device.

The computer system 1201 can include a central processing unit (CPU, also "processor" and "computer processor" herein) 1205, which can be a single core or multi core processor, or a plurality of processors for parallel processing. The computer system 1201 can also include memory or memory location 1210 (e.g., random-access memory, read-only memory, flash memory), electronic storage unit 1215 (e.g., hard disk), communication interface 1220 (e.g., network adapter) for communicating with one or more other systems, and peripheral devices 1225, such as cache, other memory, data storage and/or electronic display adapters. The memory 1210, storage unit 1215, interface 1220 and peripheral devices 1225 are in communication with the CPU 1205 through a communication bus (solid lines), such as a motherboard. The storage unit 1215 can be a data storage unit (or data repository) for storing data. The computer system 1201 can be operatively coupled to a computer network ("network") 1230 with the aid of the communication interface 1220. The network 1230 can be the Internet, an internet and/or extranet, or an intranet and/or extranet that is in communication with the Internet. The network 1230 in some cases is a telecommunication and/or data network. The network 1230 can include one or more computer servers, which can enable distributed computing, such as cloud computing. The network 1230, in some cases with the aid of the computer system 1201, can implement a peer-to-peer network, which may enable devices coupled to the computer system 1201 to behave as a client or a server.

The CPU 1205 can execute a sequence of machine-readable instructions, which can be embodied in a program or software. The instructions may be stored in a memory location, such as the memory 1210. The instructions can be directed to the CPU 1205, which can subsequently program or otherwise configure the CPU 1205 to implement methods of the present disclosure. Examples of operations performed by the CPU 1205 can include fetch, decode, execute, and writeback.

The CPU 1205 can be part of a circuit, such as an integrated circuit. One or more other components of the system 1201 can be included in the circuit. In some cases, the circuit is an application specific integrated circuit (ASIC).

The storage unit 1215 can store files, such as drivers, libraries and saved programs. The storage unit 1215 can store user data, e.g., user preferences and user programs. The computer system 1201 in some cases can include one or more additional data storage units that are external to the computer system 1201, such as located on a remote server that is in communication with the computer system 1201 through an intranet or the Internet.

Methods as described herein can be implemented by way of machine (e.g., computer processor) executable code stored on an electronic storage location of the computer system 1201, such as, for example, on the memory 1210 or electronic storage unit 1215. The machine executable or machine readable code can be provided in the form of software. During use, the code can be executed by the processor 1205. In some cases, the code can be retrieved from the storage unit 1215 and stored on the memory 1210 for ready access by the processor 1205. In some situations, the electronic storage unit 1215 can be precluded, and machine-executable instructions are stored on memory 1210.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution. The computer system 1201 can include or be in communication with an electronic display 1235 that comprises a user interface (UI) 1240 for providing, for example, the displays depicted in any of the other figures. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1205. The algorithm can, for example, implement various methods of machine learning to generate predictive models and forecasts that may be used to predict, for example, energy usage and recommendations for optimized sets of energy product offerings.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for providing a customized set of energy solutions for addressing a set of energy objectives for a building comprising:
    (a) receiving, from a geospatial database, data layers (1) derived from data collected and regularly refreshed from one or more data sources, the data comprising vector-based data layers and image-based data layers, and (2) analyzed and stored based on the data collected from the one or more data sources;
    (b) receiving one or more types of information from one or more information sources, the information comprising technical assessment, market assessment, and calibration data;
    (c) determining, with aid of one or more processors, a set of simulation assumptions based on the received data layers and the one or more types of information;
    (d) conducting, with aid of one or more processors, an analysis of the building based on the simulation assumptions, the received data layers, and the one or more types of information; and
    (e) selecting, with aid of one or more processors, the customized set of energy solutions for the building based on the analysis of the building.

2. The method of claim 1, wherein the customized set of energy solutions comprises multiple types of energy solutions.

3. The method of claim 1, wherein the data collected from the one or more data sources comprise structural information about the building.

4. The method of claim 1, wherein the vector-based data layers are collected through application programming interface (API) querying, scraping, and other collection of online data.

5. The method of claim 1, wherein the image-based data layers are collected through image processing analysis.

6. The method of claim 1, wherein the conducting of the analysis of the building based on the simulation assumptions is performed at an automated load forecasting engine that interfaces with the geospatial database.

7. The method of claim 1, further comprising showing, on a display, one or more results of the analysis of the building.

8. The method of claim 1, wherein the conducting of the analysis of the building further comprises:
    a) forecasting an energy load on the building;
    b) determining a building compatibility score per each available energy solution for the building based on a multi-criteria analysis;
    c) determining the customized set of energy solutions based on the building compatibility score associated with each available energy solution; and
    d) determining the customized set of energy solutions by solving an optimization of the set of energy objectives for the building.

9. The method of claim 8, further comprising tuning the analysis of the building based on feedback data received through an API-based pipeline.

10. The method of claim 8, further comprising generating, with aid of one or more processors, a financial and technical assessment of the customized set of energy solutions for the building.

11. The method of claim 10, further comprising showing, on a display: the forecasted energy load, the building compatibility score, the customized set of energy solutions, the simulation assumptions, and the financial and technical assessment of the customized set of energy solutions.

* * * * *